United States Patent [19]

Hanke et al.

[11] 4,054,532
[45] Oct. 18, 1977

[54] CERAMIC DIELECTRIC MATERIAL

[75] Inventors: Leopold Hanke, Beyharting; Guenther Hoffmann, Munich; Helmut Schmelz, Prien, all of Germany

[73] Assignee: Siemens Aktiengesellschaft, Berlin & Munich, Germany

[21] Appl. No.: 651,851

[22] Filed: Jan. 23, 1976

[30] Foreign Application Priority Data

Jan. 28, 1975 Germany .................. 2503438

[51] Int. Cl.$^2$ .......... C04B 35/50; C04B 35/46; H01B 3/10; H01B 3/12
[52] U.S. Cl. .................. 252/63.5; 106/73.2; 252/63; 252/520; 252/521; 361/320; 423/593
[58] Field of Search .......... 106/732; 252/63.5, 63, 252/520, 521; 423/593; 317/258; 361/320

[56] References Cited

U.S. PATENT DOCUMENTS

| | | | |
|---|---|---|---|
| 3,184,660 | 5/1965 | Robinson | 252/63.5 |
| 3,400,001 | 9/1968 | Hasumi et al. | 252/63.5 |
| 3,431,124 | 3/1969 | Hayashi et al. | 106/73.2 |
| 3,440,067 | 4/1969 | Fujiwara et al. | 106/73.2 |
| 3,490,927 | 1/1970 | Kahn et al. | 252/63.5 |
| 3,529,978 | 9/1970 | Taylor et al. | 252/63.5 |
| 3,549,415 | 12/1970 | Capek et al. | 317/258 |
| 3,630,969 | 12/1971 | Popowich | 252/521 |
| 3,660,124 | 5/1972 | Yoshioka et al. | 106/73.2 |
| 3,708,315 | 1/1973 | Matsuo et al. | 252/63.5 |
| 3,775,142 | 11/1973 | Roup | 317/258 |
| 3,788,867 | 1/1974 | Rutt | 317/258 |

*Primary Examiner*—Mayer Weinblatt
*Assistant Examiner*—John D. Smith
*Attorney, Agent, or Firm*—Hill, Gross, Simpson, Van Santen, Steadman, Chiara & Simpson

[57] ABSTRACT

A ceramic compound having the formula $(La_x A^{+2}_{1-x})_2(Ti_x B^{+5}_{1-x})_2 O_7$ wherein $A^{+2}$ is a positive divalent element selected from the group consisting of Ba, Ca, Cd, Mg, Sr and mixtures thereof and $B^{+5}$ is a positive pentavalent element selected from the group consisting of Sb, Mo, Nb, Ta, W and mixtures thereof and $x$ is a numeral ranging from 0.70 to 0.99. This compound is characterized by a relatively small temperature coefficient of permittivity, a relatively high insulation resistance, a relatively low loss factor and is compatible with relatively low cost noble metals, making it useful for forming dielectric elements in monolithic multi-layer capacitor elements.

23 Claims, No Drawings

CERAMIC DIELECTRIC MATERIAL

BACKGROUND OF THE INVENTION

1. Field of the Invention

The invention relates to ceramic dielectric materials and somewhat more particularly to ceramic dielectric materials which have a small temperature coefficient or permittivity, a process of producing such a material and an electrical element formed therefrom.

2. Prior Art

During the production of monolithic ceramic multi-layer capacitors, noble metals of the platinum group are typically used to form the inner electrodes thereof because of the high sintering temperatures and oxidizing atmosphere encountered during the production of such capacitor elements. Because the noble metals are extremely expensive (palladium being the least expensive metal within this group so that it is, from this point of view, a preferred metal for forming inner electrodes or at least for coating the surfaces thereof), workers in the art have made attempts to decrease the amount of such metal required, either by decreasing the electrode surface necessary for certain capacitors or by reducing the number of dielectric layers. A decrease in the amount of noble metal within a ceramic capacitor in either of the above suggested methods may be achieved by either increasing the permittivity value of the ceramic material or by reducing the dielectric layer thickness. A reducing in the thickness of a dielectric layer presupposes a higher electrical stress of the ceramic material, since at identical operating voltages, a higher field strength is present in thinner dielectric layers. Accordingly, ceramic materials having the lowest possible loss factor, the lowest possible temperature coefficient of permittivity and the highest possible insulation resistance are desired, provided that the permittivity value thereof is not overly low.

Known ceramic materials formulated on a $BaO-TiO_2-ZrO_2$ basis have a relatively small temperature coefficient of permittivity and, unfortunately, have a relatively low permittivity value, $\epsilon$, of about 35. Further, such known ceramic materials are sensitive to high electrical field strengths, especially at higher operating temperatures which apparently cause an ion migration process to occur. Over a period of time, ion migrations lead to a gradual reduction of the dielectric resistance of such material.

Ceramic materials which have a better permittivity value ($\epsilon$ up to 80) are also known, however, these materials always include bismuth. Since palladium is not compatible with bismuth when such ceramic materials are used to form dielectric layers of a capacitor, the electrode layer must be at least partially formed of a more expensive noble metal.

German Pat. No. 967,609 suggests electric insulating bodies and capacitor dielectric layers formed of a ternary system consisting of titanium dioxide, calcium oxide and lanthanum oxide. While this material has a relatively high permittivity value, it also has a high temperature coefficient of permittivity and a relatively high loss factor.

German Auslegeschrift No. 1,005,434 suggests certain ceramic dielectric materials and capacitor dielectric layers made therefrom which consists of aluminates of bismuth, of yttrium or of an element in the lanthanide series and may include further oxide additives. However, since this material includes bismuth, it is not compatible with palladium and thus cannot be used to form capacitor dielectric layers where the inner layers are to be at least partially formed of palladium.

U.S. Pat. No. 3,400,001 suggests a ceramic dielectric material based on calcium titanate, magnesium titanate, lanthanum oxide and neodymium oxide combined with certain bismuth additives. Accordingly, this material is also not suitable for use with palladium.

On the other hand, U.S. Pat. No. 3,431,124 or, respectively, U.S. Pat. No. 3,440,067, suggest ceramic dielectric materials based on calcium titanate, lanthanum titanate and either magnesium titanate or, respectively, strontium titanate. While neither of these materials include a bismuth additive, they are unsuitable for capacitor use since they exhibit relatively high temperature coefficients of their respective permittivities.

SUMMARY OF THE INVENTION

The invention provides certain ceramic dielectric materials which have a relatively low temperature coefficient of their permittivity and which have a relatively high permittivity value, a relatively low loss factor and a relatively high dielectric resistance. In addition, the ceramic materials of the invention are compatible with palladium so that they are exceptionally useful for forming capacitor dielectric layers in monolithic multi-layer capacitor elements and expensive platinum need not be used as a coating metal for the inner electrodes while relatively economical palladium may be used. The invention also provides a process for producing ceramic dielectric materials.

Generally, the invention provides a ceramic dielectric material consisting essentially of a pyrochlore-type compound having the formula:

$$(La_xA^{+2}_{1-x})_2(Ti_xB^{+5}_{1-x})_2O_7 \qquad (I)$$

wherein $A^{+2}$ is a positive bivalent element selected from the group consisting of Ba, Ca, Cd, Mg, Sr and mixtures thereof; $B^{+5}$ is a positive pentavalent element selected from the group consisting of Sb, Mo, Nb, Ta, W and mixtures thereof; and $x$ is a numeral ranging from 0.70 to 0.99.

In certain embodiments of the invention, the ceramic dielectric materials of the invention include an excess of up to about 6 atomic percent of titanium dioxide. Further, in certain embodiments of the ceramic dielectric material of the invention, up to about 30 atomic percent of the lanthanum therein is replaced by a rare earth element, preferably neodymium.

The ceramic dielectric materials of the invention are produced by mixing select starting materials comprised of oxides or carbonates of La and titanium dioxide, along with select double salts yieldingg the $A^{+2}$ and $B^{+5}$ elements defined hereinabove in a known manner, calcinating the resultant mixture at about 1000° to 1100° C. and then sintering the calcinated mixture in an oxidizing atmosphere at about 1200° to 1350° C. This material is exceptionally suitable for forming dielectric elements in an electrical capacitor.

DESCRIPTION OF THE PREFERRED EMBODIMENTS

The invention provides a ceramic dielectric material characterized by a relatively low temperature coefficient of permittivity and which is compatible with the noble metals, particularly with palladium. The ceramic dielectric materials of the invention have a relatively high permittivity value, a relatively low loss factor and a relatively high electrical insulation resistance (dielectric resistance). Such ceramic dielectric materials are exceptionally useful in forming capacitor dielectric layers in monolithic multi-layer capacitor elements wherein relatively low cost inner electrodes are utilized.

The ceramic dielectric materials of the invention consist of a pyrochlore-type compound having the formula:

$$(La_xA^{+2}_{1-x})_2(Ti_xB^{+5}_{1-x})_2O_7 \quad (I)$$

wherein $A^{+2}$ is a positive divalent element selected from the group consisting of Ba, Ca, Cd, Mg, Sr and mixtures thereof;

$B^{+5}$ is a positive pentavalent element selected from the group consisting of Sb, Mo, Nb, Ta, W and mixtures thereof; and $x$ is a numeral ranging from 0.70 to 0.99.

In certain embodiments of the ceramic dielectric materials of the invention, specific materials may include an excess of up to about 6 atomic percent of titanium dioxide therein. Further, in certain embodiments of the ceramic dielectric materials of the invention, up to 30 atomic percent of the lanthanum therein may be replaced by a rare earth element, preferably neodymium.

The ceramic dielectric materials of the invention are useful in forming various electrical insulating bodies and capacitor dielectric elements, particularly in monolithic multi-layer capacitors.

The ceramic dielectric materials of the invention are produced by intermixing appropriate amounts of select starting materials, generally oxides or carbonates of lanthanum, oxides of the rare earth elements, titanium oxide, along with niobates, tantalates, antimonates, molybdenates, or, respectively, tungstanates ($B^{+5}$ element) of magnesium, barium, calcium, strontium or cadmium, ($A^{+2}$ element) calcinating the resultant mixture at about 1000° to 1100° C. and then sintering the calcinated mixture in an oxidizing atmosphere at about 1200° to 1350° C. The mixture may be formed, as by pressing, into a desired body shape before or after sintering.

In order to further aid those skilled in the art in the understanding of the invention and the advantages thereof, a number of detailed compositions are set forth below in Table I, which include preferred embodiments of the invention. However, the Examples are not to be construed as limiting the scope of the invention in any way and variations may be made by those skilled in the art without departing from the spirit and scope of the invention.

Table I, below, summarizes the exemplary compositions and includes the permittivity number, $\epsilon$, the loss factor, tan $\delta$, the insulating resistance value, $R_{is}$ and the temperature coefficient of permittivity, $TK_c$, of each composition. The electrical values listed were determined by standard measurement techniques on capacitor elements which had the dielectrics thereof formed of the particular ceramic material shown. The $TK_c$ value was determined in accordance with the procedure suggested in IEC Publication 108, paragraph 14.5 (1967) whereby a first measurement of capacitance is made at room temperature (25° C.), a second measurement of capacitance is made at a lower boundary temperature (in the present case at −55° C.), a third measurement of capacitance is again made at room temperature and a fourth measurement of capacitance is made at an upper boundary temperature (in the present case at +125° C.). From the temperature coefficients calculated from such measurements for the lower and upper boundary temperatures, a mean or average value is attained and this value is listed in the Table.

Each of the sample compositions were formed by mixing together weighed-out amounts of select starting materials, lanthanum oxide (or lanthanum carbonate), rare earth oxides, titanium dioxide, along with niobates, tantalates, antimonates, molybdenates or tungstenates of magnesium, barium, calcium, strontium or cadmium, respectively. The mixtures were then calcinated in a known manner at about 1000° to 1100° C., ground to a desired particle size and formed into a desired body shape. These formed bodies were then sintered in an oxidizing atmosphere at about 1220° to 1350° C.

TABLE I

| Sample | Composition | $\epsilon$ | tan $\delta$ | $R_{is}$ ($\Omega$ cm) | $TK_c \cdot 10^6$ |
|---|---|---|---|---|---|
| 1 | $(La_{0.97}Mg_{0.03})_2(Ti_{0.97}Nb_{0.03})_2O_7$ | 50 | $< 10^{-4}$ | $> 10^{14}$ | 60 |
| 2 | $(La_{0.97}Mg_{0.03})_2(Ti_{0.97}Ta_{0.03})_2O_7$ | 50 | $1 \cdot 10^{-4}$ | $> 10^{14}$ | 55 |
| 3 | $(La_{0.94}Mg_{0.06})_2(Ti_{0.94}Ta_{0.06})_2O_7$ | 50 | $1 \cdot 10^{-4}$ | $> 10^{14}$ | 75 |
| 4 | $(La_{0.90}Mg_{0.10})_2(Ti_{0.90}Nb_{0.10})_2O_7$ | 50 | $5 \cdot 10^{-4}$ | $> 10^{14}$ | 100 |
| 5 | $(La_{0.97}Mg_{0.03})_2(Ti_{0.97}Ta_{0.03})_2O_7 + 0.06\ TiO_2$ | 50 | $5 \cdot 10^{-4}$ | $> 10^{14}$ | 40 |
| 6 | $(La_{0.97}Ba_{0.03})_2(Ti_{0.97}Nb_{0.03})_2O_7$ | 51 | $1 \cdot 10^{-4}$ | $> 10^{14}$ | 20 |
| 7 | $(La_{0.95}Ba_{0.05})_2(Ti_{0.95}Nb_{0.05})_2O_7$ | 52 | $< 10^{-4}$ | $> 10^{14}$ | 0 |
| 8 | $(La_{0.93}Ba_{0.07})_2(Ti_{0.93}Nb_{0.07})_2O_7$ | 52 | $1 \cdot 10^{-4}$ | $> 10^{14}$ | 20 |
| 9 | $(La_{0.92}Nd_{0.03}Ba_{0.05})_2(Ti_{0.95}Nb_{0.05})_2O_7$ | 55 | $1 \cdot 10^{-4}$ | $> 10^{14}$ | 10 |
| 10 | $(La_{0.90}Nd_{0.05}Ba_{0.05})_2(Ti_{0.95}Nb_{0.05})_2O_7$ | 51 | $2 \cdot 10^{-4}$ | $> 10^{14}$ | 40 |
| 11 | $(La_{0.85}Nd_{0.10}Ba_{0.05})_2(Ti_{0.95}Nb_{0.05})_2O_7$ | 50 | $< 10^{-4}$ | $> 10^{14}$ | 30 |
| 12 | $(La_{0.80}Nd_{0.15}Ba_{0.05})_2(Ti_{0.95}Nb_{0.05})_2O_7$ | 58 | $1 \cdot 10^{-4}$ | $> 10^{14}$ | 35 |
| 13 | $(La_{0.75}ND_{0.20}Ba_{0.05})_2(Ti_{0.95}Nb_{0.05})_2O_7$ | 53 | $3 \cdot 10^{-4}$ | $> 10^{14}$ | 45 |
| 14 | Same as Nr. 7 + 1% Ti | 53 | $1 \cdot 10^{-4}$ | $> 10^{14}$ | 10 |
| 15 | Same as Nr. 7 + 0.5% Ti | 53 | $1 \cdot 10^{-4}$ | $> 10^{14}$ | 45 |
| 16 | Same as Nr. 7 + 1.5% Ti | 53 | $1 \cdot 10^{-4}$ | $> 10^{14}$ | 30 |
| 17 | Same as Nr. 7 + 2% Ti | 53 | $1 \cdot 10^{-4}$ | $> 10^{14}$ | 30 |
| 18 | $(La_{0.94}Ba_{0.06})_2(Ti_{0.94}Nb_{0.06})_2O_7 + 0.04\ TiO_2$ | 52 | $< 10^{-4}$ | $> 10^{14}$ | 15 |
| 19 | $(La_{0.93}Ba_{0.07})_2(Ti_{0.95}Nb_{0.07})_2O_7 + 0.04\ TiO_2$ | 52 | $< 10^{-4}$ | $> 10^{14}$ | 15 |
| 20 | $(La_{0.92}Ba_{0.08})_2(Ti_{0.92}Nb_{0.08})_2O_7 + 0.04\ TiO_2$ | 54 | $< 10^{-4}$ | $> 10^{14}$ | −40 |
| 21 | $(La_{0.92}Ba_{0.05}Ca_{0.03})_2(Ti_{0.92}Nb_{0.08})_2O_7 + 0.04\ TiO_2$ | 53 | $< 10^{-4}$ | $> 10^{14}$ | 0 |
| 22 | $(La_{0.9}Ba_{0.1})_2(Ti_{0.9}Nb_{0.1})_2O_7 + 0.04\ TiO_2$ | 54 | $10^{-4}$ | $> 10^{14}$ | −30 |
| 23 | $(La_{0.85}Ba_{0.15})_2(Ti_{0.85}Nb_{0.15})_2O_7 + 0.04\ TiO_2$ | 57 | $10^{-3}$ | $10^{14}$ | −40 |
| 24 | $(La_{0.925}Ba_{0.075})_2(Ti_{0.925}Nb_{0.075})_2O_7 + 0.04\ TiO_2$ | 52.5 | $5 \cdot 10^{-4}$ | $> 10^{14}$ | −60 |
| 25 | $(La_{0.92}Mg_{0.08})_2(TiO_{0.92}Nb_{0.08})_2O_7 + 0.04\ TiO_2$ | 50 | $5 \cdot 10^{-4}$ | $10^{14}$ | 85 |
| 26 | $(La_{0.94}Ba_{0.03}Ca_{0.03})_2(Ti_{0.94}Nb_{0.06})_2O_7 + 0.04\ TiO_2$ | 51.5 | $5 \cdot 10^{-4}$ | $10^{14}$ | 35 |
| 27 | $(La_{0.92}Ba_{0.04}Ca_{0.04})_2(Ti_{0.92}Nb_{0.08})_2O_7 + 0.04\ TiO_2$ | 52.5 | $5 \cdot 10^{-4}$ | $10^{14}$ | 35 |
| 28 | $(La_{0.94}Ba_{0.03}Mg_{0.03})_2(Ti_{0.94}Nb_{0.06})_2O_7 + 0.04\ TiO_2$ | 53 | $10^{-4}$ | $10^{14}$ | 50 |
| 29 | $(La_{0.92}Ba_{0.04}Mg_{0.04})_2(Ti_{0.92}Nb_{0.08})_2O_7 + 0.04\ TiO_2$ | 52.5 | $10^{-4}$ | $> 10^{14}$ | 35 |
| 30 | $(La_{0.94}Mg_{0.03}Ca_{0.03})_2(Ti_{0.94}Nb_{0.06})_2O_7 + 0.04\ TiO_2$ | 50 | $2 \cdot 10^{-4}$ | $> 10^{14}$ | 80 |

TABLE I-continued

| Sample | Composition | ε | tan δ | $R_{ij}$ (Ω cm) | $TK_c \cdot 10^6$ |
|---|---|---|---|---|---|
| 31 | $(La_{0.92}Mg_{0.04}Ca_{0.04})_2(Ti_{0.92}Nb_{0.08})_2O_7 + 0.04\ TiO_2$ | 49 | $5 \cdot 10^{-4}$ | $10^{14}$ | 95 |
| 32 | $(La_{0.94}Mg_{0.02}Ca_{0.02}Ba_{0.02})_2(Ti_{0.94}Nb_{0.06})_2O_7 + 0.04\ TiO_2$ | 51 | $2 \cdot 10^{-4}$ | $>10^{14}$ | 60 |
| 33 | $(La_{0.92}Ba_{0.03}Ca_{0.02}Mg_{0.03})_2(Ti_{0.92}Nb_{0.08})_2O_7 + 0.04\ TiO_2$ | 52 | $5 \cdot 10^{-4}$ | $>10^4$ | 55 |
| 34 | $(La_{0.91}Ba_{0.08}Mg_{0.01})_2(Ti_{0.91}Nb_{0.09})_2O_7 + 0.04\ TiO_2$ | 55 | $<10^{-4}$ | $>10^{14}$ | −15 |
| 35 | $(La_{0.90}Ba_{0.08}Mg_{0.02})_2(Ti_{0.90}Nb_{0.10})_2O_7 + 0.04\ TiO_2$ | 56 | $2 \cdot 10^{-4}$ | $10^{14}$ | −25 |
| 36 | $(La_{0.89}Ba_{0.08}Mg_{0.03})_2(Ti_{0.89}Nb_{0.11})_2O_7 + 0.04\ TiO_2$ | 56 | $3 \cdot 10^{-4}$ | $>10^{14}$ | −35 |
| 37 | $(La_{0.89}Ba_{0.08}Mg_{0.01}Ca_{0.02})_2(Ti_{0.89}Nb_{0.11})_2O_7 + 0.04\ TiO_2$ | 54 | $5 \cdot 10^{-4}$ | $10^{14}$ | −25 |
| 38 | $(La_{0.94}Ba_{0.06})_2(Ti_{0.94}W_{0.06})_2O_7 + 0.04\ TiO_2$ | 44 | $<10^{-4}$ | $>10^{14}$ | 40 |
| 39 | $(La_{0.94}Ba_{0.06})_2(Ti_{0.94}Mo_{0.06})_2O_7 + 0.04\ TiO_2$ | 37 | $<10^{-4}$ | $10^{14}$ | 40 |
| 40 | $(La_{0.94}Ba_{0.06})_2(Ti_{0.94}Sb_{0.06})_2O_7 + 0.04\ TiO_2$ | 51 | $<10^{-4}$ | $>10^{14}$ | 10 |
| 41 | $(La_{0.92}Ba_{0.07}Mg_{0.01})_2(Ti_{0.92}Nb_{0.08})_2O_7 + 0.04\ TiO_2$ | 55 | $<10^4$ | $>10^{14}$ | −10 |
| 42 | $(La_{0.93}Ba_{0.06}Mg_{0.01})_2(Ti_{0.93}Nb_{0.07})_2O_7 + 0.04\ TiO_2$ | 54 | $<10^{-4}$ | $<10^{14}$ | 15 |
| 43 | $(La_{0.89}Ba_{0.06}Mg_{0.05})_2(Ti_{0.89}Nb_{0.11})_2O_7 + 0.04\ TiO_2$ | 56 | $<10^{-4}$ | $>10^{14}$ | −40 |
| 44 | $(La_{0.87}Ba_{0.08}Mg_{0.05})_2(Ti_{0.87}Nb_{0.13})_2O_7 + 0.04\ TiO_2$ | 57 | $<10^{-4}$ | $>10^{14}$ | −70 |
| 45 | $(La_{0.90}Ba_{0.05}Mg_{0.05})_2(Ti_{0.90}Nb_{0.1})_2O_7 + 0.04\ TiO_2$ | 54 | $<10^{-4}$ | $>10^{14}$ | −10 |
| 46 | $(La_{0.93}Cd_{0.06}Mg_{0.01})_2(Ti_{0.93}Nb_{0.07})_2O_7 + 0.04\ TiO_2$ | 49 | $<10^{-4}$ | $>10^{14}$ | 60 |
| 47 | $(La_{0.91}Ba_{0.06}Mg_{0.03})_2(Ti_{0.91}Nb_{0.09})_2O_7 + 0.04\ TiO_2$ | 54 | $<10^{-4}$ | $>10^{14}$ | 0 |
| 48 | $(La_{0.89}Ba_{0.04}Mg_{0.07})_2(Ti_{0.89}Nb_{0.11})_2O_7 + 0.04\ TiO_2$ | 54 | $<10^{-4}$ | $>10^{14}$ | −20 |
| 49 | $(La_{0.88}Ba_{0.03}Mg_{0.09})_2(Ti_{0.88}Nb_{0.12})_2O_7 + 0.04\ TiO_2$ | 57 | $<10^{-4}$ | $>10^{14}$ | −60 |
| 50 | $(La_{0.875}Ba_{0.078}Mg_{0.047})_2(Ti_{0.875}Nb_{0.125})_2O_7 + 0.04\ TiO_2$ | 57 | $<10^{-4}$ | $>10^{14}$ | −70 |
| 51 | $(La_{0.85}Ba_{0.10}Mg_{0.05})_2(Ti_{0.85}Nb_{0.15})_2O_7 + 0.04\ TiO_2$ | 60 | $<10^{-4}$ | $>10^{14}$ | −150 |
| 52 | $(La_{0.85}Ba_{0.08}Mg_{0.07})_2(Ti_{0.85}Nb_{0.15})_2O_7 + 0.04\ TiO_2$ | 60 | $<10^{-4}$ | $>10^{14}$ | −170 |
| 53 | $(La_{0.91}Ba_{0.05}Mg_{0.04})_2(Ti_{0.91}Nb_{0.09})_2O_7 + 0.04\ TiO_2$ | 53.5 | $<10^{-4}$ | $>10^{14}$ | 20 |
| 54 | $(La_{0.90}Ba_{0.06}Mg_{0.04})_2(Ti_{0.9}Nb_{0.1})_2O_7 + 0.04\ TiO_2$ | 55 | $<10^{-4}$ | $>10^{14}$ | −10 |
| 55 | $(La_{0.89}Ba_{0.06}Mg_{0.05})_2(Ti_{0.89}Nb_{0.11})_2O_7 + 0.04\ TiO_2$ | 55 | $<10^{-4}$ | $>10^{14}$ | −25 |
| 56 | $(La_{0.89}Ba_{0.05}Mg_{0.06})_2(Ti_{0.89}Nb_{0.11})_2O_7 + 0.04\ TiO_2$ | 54.5 | $<10^{-4}$ | $>10^{14}$ | −20 |
| 57 | $(La_{0.90}Ba_{0.04}Mg_{0.06})_2(Ti_{0.9}Nb_{0.1})_2O_7 + 0.04\ TiO_2$ | 53 | $<10^{-4}$ | $>10^{14}$ | 5 |
| 58 | $(La_{0.91}Ba_{0.04}Mg_{0.05})_2(Ti_{0.91}Nb_{0.09})_2O_7 + 0.04\ TiO_2$ | 53 | $<10^{-4}$ | $>10^{14}$ | 20 |
| 59 | Same as No. 45, subjected to a lesser degree of grinding. | 54 | $<10^{-4}$ | $>10^{14}$ | 5 |

The advantages of ceramic dielectric materials formulated in accordance with the principles of the invention and readily apparent from the foregoing Table. As shown, these materials are characterized by relatively low loss factors, relatively high dielectric resistance values, relatively high permittivity values and a relatively low temperature dependence of permittivity (relatively low temperature coefficient of permittivity).

In order to examine process parameters, the ceramic dielectric material of Sample No. 18 in the foregoing Table was further investigated. In one instance, an increasing amount of titanium dioxide surplus was utilized without otherwise changing the composition and it was noted that the $TK_c$ of the resulting material became progressively more negative (about $-5 \cdot 10^{-6}$ per percent $TiO_2$). In another instance, an increase in the sintering temperature used to process Sample composition No. 18 caused the $TK_c$ to become more positive (about $0.6 \cdot 10^{-6}$ per degree). In addition, a $TK_c$ shift toward more negative values was noted with a more thorough grinding of the material (i.e., by increasing the particle fineness). The shift of the $TK_c$ value toward more negative values was also observed when Sample compositions 45 and 59 (which have substantially identical compositions) were subjected to a more thorough grinding.

Additionally, a test of field strength stress and a test of endurance stress were performed on multi-layer capacitors having ceramic dielectric elements composed of Sample compositions 1 and 18, each formed into 30μm thick layers and were subjected to voltage loads of 200 volts. After 1300 hours at 200° C. (corresponding to 260,000 hours at 125° C. or 5,000,000 operating hours at 80° C.) no sign of any deterioration of the insulation resistance was noted.

To the best of our knowledge, such field strength and endurance capabilities have not been previously observed with known capacitor dielectric elements. The combination of these characteristics along with compatibility thereof with relatively cheap palladium and the relatively high permittivity values thereof provide a decisive advantage vis-a-vis known capacitor dielectrics.

Further specific embodiments of ceramic dielectric materials of the invention comprise the following compounds:

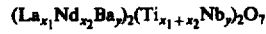
$(La_{x_1}Nd_{x_2}Ba_y)_2(Ti_{x_1+x_2}Nb_y)_2O_7$ wherein $x_1$ is a numeral ranging from 0.75 to 0.92; $x_2$ is a numeral ranging from 0.03 to 0.2 and $y$ is a numeral equal to the sum of $x_1$ and $x_2$ subtracted from one but greater than zero.

Further specific embodiments of ceramic dielectric materials of the invention comprise the following compounds:

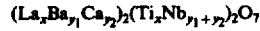
$(La_xBa_{y_1}Ca_{y_2})_2(Ti_xNb_{y_1+y_2})_2O_7$ wherein $x_1$ is a numeral ranging from 0.92 to 0.94 and $y_1$ and $y_2$ are numerals ranging from 0.02 to 0.06 so that sum of $y_1$ and $y_2$ is equal to one minus $x$, with the proviso that these compounds include an excess of up to about 5 atomic percent of titanium dioxide.

Further specific embodiments of ceramic dielectric materials of the invention comprise the following compounds:

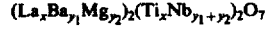
$(La_xBa_{y_1}Mg_{y_2})_2(Ti_xNb_{y_1+y_2})_2O_7$ wherein $x$ is a numeral ranging from 0.85 to 0.94 and $y_1$ and $y_2$ are numerals ranging from 0.01 to 0.10 so that the sum of $y_1$ and $y_2$ is equal to one minus $x$, with the proviso that these compounds include an excess of up to about 5 atomic percent of titanium dioxide.

Further specific embodiments of ceramic dielectric materials of the invention comprise the following compounds:

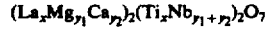
$(La_xMg_{y_1}Ca_{y_2})_2(Ti_xNb_{y_1+y_2})_2O_7$ wherein $x$ is a numeral ranging from 0.92 to 0.94 and $y_1$ and $y_2$ are numerals ranging from 0.03 to 0.04 so that the sum of $y_1$ and $y_2$ is equal to $1 - x$, with the proviso that these compounds include an excess of up to about 5 atomic percent of titanium dioxide.

Further specific embodiments of ceramic dielectric materials of the invention comprise the following compounds:

$$(La_xMg_{y_1}Ba_{y_2}Ca_{y_3})_2(Ti_xNb_{y_1+y_2+y_3})_2O_7$$

wherein $x$ is a numeral ranging from 0.89 to 0.94 and $y_1$, $y_2$ and $y_3$ are numerals ranging from 0.01 to 0.08 so that the sum of $y_1$, $y_2$ and $y_3$ is equal to $1 - x$, with the proviso that these compounds include an excess of up to about 5 atomic percent of titanium dioxide.

Further specific embodiments of ceramic dielectric materials of the invention comprise the following compounds:

$$(La_xMg_{1-x})_2(Ti_xNb_{1-x})_2O_7$$

wherein $x$ is a numeral ranging from 0.90 to 0.97 and such compounds which also include an excess of up to about 5 atomic percent of titanium dioxide.

Further specific embodiments of ceramic dielectric materials of the invention comprise the following compounds:

$$(La_xMg_{1-x})_2(Ti_xTa_{1-x})_2O_7$$

wherein $x$ is a numeral ranging from 0.94 to 0.97 and such compounds which also include an excess of up to about 6 atomic percent of titanium dioxide.

Yet further specific embodiments of ceramic dielectric materials of the invention comprise the following compounds:

$$(La_xBa_{1-x})_2(Ti_xNb_{1-x})_2O_7$$

wherein $x$ is a numeral ranging from 0.85 to 0.97 and such compounds which also include an excess of about 0.5 to 5 atomic percent of titanium dioxide.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the heretoappendant claims.

We claim as our invention:

1. A ceramic dielectric material having a relatively low temperature coefficient of permittivity and consisting of a compound defined by the formula:

$$(La_xA^{+2}_{1-x})_2(Ti_xB^{+5}_{1-x})_2O_7$$

wherein
$A^{+2}$ is a positive divalent element selected from the group consisting of Ba, Ca, Cd, Mg, Sr and mixtures thereof;
$B^{+5}$ is a positive pentavalent element selected from the group consisting of Sb, Mo, Nb, Ta, W and mixtures thereof; and
$x$ is a numeral ranging from 0.70 to 0.99.

2. A ceramic dielectric material as defined in claim 1 wherein up to about 30 atomic percent of lanthanum in said compound is replaced by a rare earth element.

3. A ceramic dielectric material as defined in claim 2 wherein said rare earth element is neodymium.

4. A ceramic dielectric material as defined in claim 3 wherein said compound comprises:

$$(La_{x_1}Nd_{x_2}Ba_y)_2(Ti_{x_1+x_2}Nb_y)_2O_7$$

wherein
$x_1$ is a numeral ranging from 0.75 to 0.92;
$x_2$ is a numeral ranging from 0.03 to 0.2; and
$y$ is a numeral equal to the sum of $x_1$ and $x_2$ subtracted from one but greater than zero.

5. A ceramic dielectric material as defined in claim 1 which includes an excess of up to about 6 atomic percent of titanium dioxide.

6. A ceramic dielectric material as defined in claim 5 wherein up to about 30 atomic percent of lanthanum in said compound is replaced by a rare earth element.

7. A ceramic dielectric material as defined in claim 6 wherein said rare earth element is neodymium.

8. A ceramic dielectric material as defined in claim 5 wherein said compound comprises:

$$(La_xBa_{y_1}Ca_{y_2})_2(Ti_xNb_{y_1+y_2})_2O_7$$

wherein
$x$ is a numeral ranging from 0.92 to 0.94; and
$y_1$ and $y_2$ are numerals ranging from 0.02 to 0.06 so that the sum of $y_1$ and $y_2$ is equal to $1 - x$;
said compound including an excess of up to about 5 atomic percent of titanium dioxide.

9. A ceramic dielectric material as defined in claim 5 wherein said compound comprises:

$$(La_xBa_{y_1}Mg_{y_2})_2(Ti_xNb_{y_1+y_2})_2O_7$$

wherein
$x$ is a numeral ranging from 0.85 to 0.94; and
$y_1$ and $y_2$ are numerals ranging from 0.01 to 0.10 so that the sum of $y_1$ and $y_2$ is equal to $1 - x$;
said compound including an excess of up to about 5 atomic percent of titanium dioxide.

10. A ceramic dielectric material as defined in claim 5 wherein said compound comprises:

$$(La_xMg_{y_1}Ca_{y_2})_2(Ti_xNb_{y_1+y_2})_2O_7$$

wherein
$x$ is a numeral ranging from 0.92 to 0.94; and
$y_1$ and $y_2$ are numerals ranging from 0.03 to 0.04 so that the sum of $y_1$ and $y_2$ is equal to $1 - x$;
said compound including an excess of up to about 5 atomic percent of titanium dioxide.

11. A ceramic dielectric material as defined in claim 5 wherein said compound comprises:

$$(La_xMg_{y_1}Ba_{y_2}Ca_{y_3})_2(Ti_xNb_{y_1+y_2+y_3})_2O_7$$

wherein
$x$ is a numeral ranging from 0.89 to 0.94; and
$y_1$, $y_2$ and $y_3$ are numerals ranging from 0.01 to 0.08 so that the sum of $y_1$ and $y_2$ and $y_3$ is equal to one minus $x$;
said compound including an excess of up to about 5 atomic percent of titanium dioxide.

12. A ceramic dielectric material as defined in claim 5 wherein said compound comprises:

$$(La_{0.94}Ba_{0.06})_2(Ti_{0.94}W_{0.06})_2O_7$$

said compound including an excess of about 4 atomic percent of titanium dioxide.

13. A ceramic dielectric material as defined in claim 5 wherein said compound comprises:

$$(La_{0.94}Ba_{0.06})_2(Ti_{0.94}Mo_{0.06})_2O_7$$

said compound including an excess of about 4 atomic percent of titanium dioxide.

14. A ceramic dielectric material as defined in claim 5 wherein said compound comprises:

$$(La_{0.94}Ba_{0.06})_2(Ti_{0.94}Sb_{0.06})_2O_7$$

said compound including an excess of about 4 atomic percent of titanium dioxide.

15. A ceramic dielectric material as defined in claim 5 wherein said compound comprises:

$$(La_{0.93}Cd_{0.06}Mg_{0.01})_2(Ti_{0.93}Nb_{0.07})_2O_7$$

said compound including an excess of up to about 5 atomic percent of titanium dioxide.

16. A ceramic dielectric material as defined in claim 1 wherein said compound comprises:

$$(La_xMg_{1-x})_2(Ti_xNb_{1-x})_2O_7$$

wherein
$x$ is a numeral ranging from 0.90 to 0.97.

17. A ceramic dielectric material as defined in claim 16 and including an excess of up to about 5 atomic percent of titanium dioxide.

18. A ceramic dielectric material as defined in claim 1 wherein said compound comprises:

$$(La_xMg_{1-x})_2(Ti_xTa_{1-x})_2O_7$$

wherein
$x$ is a numeral ranging from 0.94 to 0.97.

19. A ceramic dielectric material as defined in claim 18 and including an excess of about 6 atomic percent of titanium dioxide.

20. A ceramic dielectric material as defined in claim 1 wherein said compound comprises:

$$(La_xBa_{1-x})_2(Ti_xNb_{1-x})_2O_7$$

wherein
$x$ is a numeral ranging from 0.85 to 0.97.

21. A ceramic dielectric material as defined in claim 20 and including an excess of about 0.5 to 5 atomic percent of titanium dioxide.

22. A process for producing a ceramic dielectric material as defined in claim 1 wherein starting materials for said compound comprise lanthanum oxide or lanthanum carbonate, rare earth oxides, titanium dioxide and niobates, tantalates, antimonates, molybdenates and tungstenates of magnesium, barium, calcium, strontium and cadmium respectively, and comprises:
   mixing select amounts of said starting materials to form a substantially uniform mixture;
   calcinating said uniform mixture at about 1000° to 1100° C.;
   grinding the calcinated mixture and forming a desired body shape therefrom; and
   sintering said formed body shapes in an oxidizing atmosphere at about 1200° to 1350° C.

23. A dielectric element in an electrical capacitor composed of a ceramic dielectric material as defined in claim 1.

* * * * *